(12) United States Patent
Vlk (10) Patent No.: US 12,203,305 B2
(45) Date of Patent: Jan. 21, 2025

(54) MOTOR-DRIVEN COVER DEVICE

(71) Applicant: HBPO GmbH, Lippstadt (DE)

(72) Inventor: Vladimir Vlk, Hradiste (CZ)

(73) Assignee: HPBO GmbH, Lippstadt (DE)

(*) Notice: Subject to any disclaimer, the term of this patent is extended or adjusted under 35 U.S.C. 154(b) by 347 days.

(21) Appl. No.: 17/827,388

(22) Filed: May 27, 2022

(65) Prior Publication Data

US 2022/0381080 A1  Dec. 1, 2022

(30) Foreign Application Priority Data

May 27, 2021 (DE) ................... 10 2021 113 734.9

(51) Int. Cl.
*E05D 15/20* (2006.01)
*B60L 53/16* (2019.01)

(52) U.S. Cl.
CPC .............. *E05D 15/20* (2013.01); *B60L 53/16* (2019.02); *E05Y 2201/434* (2013.01); *E05Y 2201/626* (2013.01); *E05Y 2201/686* (2013.01); *E05Y 2201/702* (2013.01); *E05Y 2900/534* (2013.01)

(58) Field of Classification Search
CPC ......... E05D 15/20; E05D 3/154; B60L 53/16; E05Y 2201/434; E05Y 2201/626; E05Y 2201/686; E05Y 2201/702; E05Y 2900/534; E05Y 2201/638; E05F 7/02; E05F 15/63; Y02T 10/70; Y02T 10/7072; Y02T 90/14

See application file for complete search history.

(56) References Cited

U.S. PATENT DOCUMENTS

| | | | |
|---|---|---|---|
| 2020/0105074 A1* | 4/2020 | Fukuda | B60Q 1/543 |
| 2022/0282531 A1* | 9/2022 | Shaw | E05B 83/34 |
| 2023/0151669 A1* | 5/2023 | Scott-Collins | E05F 15/611 |
| | | | 439/306 |
| 2024/0044184 A1* | 2/2024 | Shaw | E05B 81/90 |

FOREIGN PATENT DOCUMENTS

| | | | | |
|---|---|---|---|---|
| DE | 102017201365 A1 * | 8/2018 | | B60K 15/05 |
| DE | 102018125204 A1 * | 4/2019 | | B60L 53/16 |
| WO | WO-2022101465 A1 * | 5/2022 | | B60K 1/00 |

OTHER PUBLICATIONS

English Translation of WO2022101465A1 (Year: 2022).*

* cited by examiner

*Primary Examiner* — Lori Lyjak (74) *Attorney, Agent, or Firm* — Thorpe North & Western, LLP (57) ABSTRACT

A motor-driven cover device for covering and releasing a charging port arranged on the vehicle body of an electric vehicle with respect to a vehicle exterior. A cover plate can cover the charging port in a closed state, a motor can be operatively connected to the cover plate for driving an opening movement and a closing movement of the cover plate. A force transmission device can transmit a motor power for carrying out the opening movement and closing movement of the cover plate. A guide element can guide the cover plate along a movement path during the opening and closing movement of the cover plate. The cover plate can be moved along the vehicle body in a motor-driven manner during the opening and closing movement, the vehicle body covering the cover plate at least partially with respect to the vehicle exterior in an open state of the cover device.

20 Claims, 9 Drawing Sheets

MOTOR-DRIVEN COVER DEVICE

RELATED APPLICATION(S)

This application claims priority to German Patent Application No. 10 2021 113 734.9, filed May 27, 2021, which is incorporated here by reference.

BACKGROUND

Cover devices for covering and uncovering charging ports are known from the prior art and are used primarily in automotive engineering. A disadvantage of the known devices, in addition to the often low level of user comfort when covering and uncovering, is in particular the relatively high space requirement of electric vehicles during a charging process. The high space requirement results from the fact that the known cover devices are usually swiveled outward when charging ports are uncovered and often protrude from the vehicle at a 90° angle in an open state.

The cover devices protruding from the vehicle represent an obstacle that is sometimes difficult for pedestrians to see and with which they can collide. This can result not only in personal injury, but also in damage to the cover devices. In addition, the cover devices protruding from the vehicle are often the victims of vandalism, as the cover devices can easily be snapped off by a vehicle due to their unfavorable angle.

SUMMARY

The present invention relates to a motor-driven cover device and a method for covering and uncovering a charging port arranged on the vehicle body of an electric vehicle with respect to a vehicle exterior, and to an electric vehicle having such a motor-driven covering device.

In one example, the present invention can at least partially overcome the aforementioned disadvantages of known cover devices for covering and uncovering charging ports. In particular, the invention can provide a cover device for covering and releasing a charging port arranged on the vehicle body of an electric vehicle, which has a minimum space requirement during a charging process and at the same time provides safe charging with a high charging comfort as well as safe covering and releasing of a charging port.

Further advantages, features and details of the invention will be apparent from the following description, in which embodiments of the invention are described in detail with reference to the drawings. In this connection, the features mentioned in the claims and in the description may each be associated with the invention individually or in any combination.

BRIEF DESCRIPTION OF THE DRAWINGS

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

As used herein, the term "at least one of" is intended to be synonymous with "one or more of." For example, "at least one of A, B and C" explicitly includes only A, only B, only C, and combinations of each.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

According to the invention, a motor-driven cover device for covering and uncovering a charging port arranged on the vehicle body of an electric vehicle to a vehicle exterior is provided, which comprises a cover plate for covering the charging port in a closed state, a motor operatively connected to the cover plate for driving an opening movement and a closing movement of the cover plate, a force transmission device for transmitting a motor power of the motor for executing an opening movement and a closing movement of the cover plate, and guide element for guiding the cover plate along a movement path during the opening movement and the closing movement of the cover plate, a force transmission device for transmitting a motor power of the motor for performing the opening movement and the closing movement of the cover plate, and guide element for guiding the cover plate along a movement path during the opening movement and the closing movement of the cover plate. In addition, the motor-driven cover device is designed/configured according to the invention in such a way that the cover plate can be moved along the vehicle body of the electric vehicle in the opening and closing movement driven by the motor, the vehicle body covering the cover plate at least partially with respect to the vehicle exterior in an opened state of the cover device.

The present cover device for covering and uncovering a charging port arranged on the vehicle body of an electric vehicle can be provided in particular for use in at least partially electrically operated motor vehicles. In addition to use in at least partially electrically operated passenger cars or trucks, the cover device according to the invention can also be used in other at least partially electrically operated devices of transport, such as forklifts, cranes, ships or flying objects. The cover device according to the present invention can be formed in particular in the form of a door cover device for covering and releasing a charging port.

In the context of the invention, an electric vehicle—as already mentioned above—is also understood to mean a vehicle that can only be partially or temporarily operated electrically, such as a hybrid vehicle or the like. According to the invention, a vehicle body of the electric vehicle is understood to mean in particular the complete frame or vehicle body of a motor vehicle, comprising wings, rear wings, front end module, trunk, hood and the like. According to the present invention, a charging port is understood to mean in particular the receiving unit for inserting a charging plug. Furthermore, according to the invention, a vehicle exterior is understood to mean in particular the environment of the electric vehicle directly adjacent to the vehicle body. Furthermore, a cover plate is understood in the context of the invention to mean in particular a flat, planar flap or plate. The cover plate can have various shapes, for example round, oval, rectangular, elliptical or similar shapes. In one alternative, during an opening and closing movement, the cover plate is motor-driven and can be moved along the vehicle body of the electric vehicle perpendicular to a direction of insertion of a charging plug from a vehicle exterior into the charging port.

In the context of a compact, flexibly controllable and safely openable and closable motor-driven cover device, it can be provided in accordance with the invention in particular that the force transmission device is formed in the form of a four-bar linkage drive, wherein the four-bar linkage drive can have at least one drive lever and one guide lever for transmitting a motor force of the motor for executing the opening movement and the closing movement of the cover plate, wherein in particular the drive lever and the guide lever are connected to the cover plate. In this case, the cover plate can be rotatably mounted in particular via the connection to the drive lever and to the guide lever. In one alternative, the cover plate can be at least partially rotatable or movable laterally along a vehicle width.

With regard to a structurally simple as well as flexibly and purposefully controllable motor-driven cover device, it can be advantageously provided in accordance with the invention that the drive lever is in engagement with the motor, the drive lever can be arranged directly on the motor, the drive lever being arranged in particular adjacent to a guide rail via which the drive lever can be guided in its movement. In one example, the drive lever can be connected to the motor via a first end and to the cover plate via a second end. The connection can be of a form-fit, force-fit or material-fit design. Advantageously, the drive lever can, for example, have a recess arranged at its first end for insertion of the motor or part of the motor and in this way be connected to the motor in a form-fitting manner. Via its first end, the drive lever can also be arranged on the guide rail, for example, via which the drive lever can be held in a guide track.

With regard to a structurally simple, flexible and purposefully controllable motor-driven cover device, it can be advantageously provided in accordance with the invention that the guide lever is rotatably and displaceably mounted on a bearing pin via an end of the guide lever arranged remote from the cover plate, the bearing pin can be firmly connected to the vehicle body of the electric vehicle. Optionally, the guide lever can be connected to the bearing pin via a first end and to the cover plate via a second end. In this case, the connection can be of form-fit, force-fit or also material-bond design/configuration. Advantageously, the guide lever can, for example, have a recess arranged at its first end for insertion of the bearing pin and in this way be positively connected to the bearing pin.

In order to be able to set a flexibly adjustable and at the same time precisely controllable movement of a motor-driven cover device in a structurally simple manner, it can be advantageously provided that the drive lever and the guide lever are at least temporarily positively connected to one another during an opening and a closing movement, optionally via a groove-spring connection, wherein the drive lever and the guide lever are temporarily connected to one another in particular in such a way that the guide lever can be entrained via the drive lever in a direction perpendicular to the vehicle body while ensuring free rotatability. The groove-spring connection between the drive lever and the guide lever can be made opposite the motor on the side of the cover plate. Optionally, the groove is arranged inside the guide lever and the spring at the end of the drive lever, opposite the engine. By temporarily establishing a positive connection between the drive lever and the guide lever, it is possible in particular to use the drive lever to move the guide lever not only laterally along the vehicle body during an opening movement of the motor-driven cover device, but also perpendicularly to the vehicle body, and thus to insert the cover plate into the vehicle outer surface during an opening movement in the direction of the charging port, or outwardly into the recess in the vehicle outer surface during a closing movement against the direction of the charging port for a flush closure with the vehicle outer surface.

Within the scope of a safe and precisely controllable movement of an objective motor-driven cover device during an opening movement, it can therefore be advantageously provided in accordance with the invention that the motor-driven cover device is designed/configured in such a way that, during the opening movement, the cover plate, driven by the motor, can initially be moved perpendicularly to the vehicle body in the direction of the charging port, wherein, driven by the motor, the drive lever can be movable first and then, by means of coupling via a groove-spring connection, the guide lever is also movable in the direction of the charging port, wherein the movement perpendicular to the vehicle body in the direction of the charging port is limited in particular to less than 5 cm. Here, optionally via the motor-driven rotation of the motor, first the drive lever can be raised and then, for example, via a -groove-spring coupling to the guide lever, the guide lever can also be raised, so that the cover plate can be raised or lowered into the outer surface or vehicle body of the electric vehicle. With regard to the limitation of movement, the drive lever and the guide lever can advantageously only be moved perpendicular to the vehicle body in the direction of the charging port until the drive lever can be set into a rotary movement behind the outer surface or vehicle body of the vehicle. A movement of just 1 cm perpendicular to the vehicle body is usually sufficient for this.

In order to ensure a flowing opening movement of the present motor-operated cover device, it can be advantageously further provided in accordance with the invention that the cover device can be moved laterally along the vehicle body in an opening movement after a movement perpendicular to the vehicle body in the direction of the charging port, wherein the movement laterally along the vehicle body can be driven via a further rotation of the motor, wherein a rotation of the drive lever and of the guide lever in particular can be generated via the rotation of the motor. By means of a further rotation of the motor, for example, a rotation of the drive lever can be generated, whereby the cover plate can be moved laterally along the vehicle body. The cover plate can be pushed along underneath the outer surface of the vehicle or the vehicle body of the electric vehicle.

Within the scope of a safe and precisely controllable movement of the present motor-driven cover device during a closing movement, it can be advantageously provided, analogously to an opening movement, that the motor-driven cover device can first be moved laterally along the vehicle body in a closing movement driven by the motor, wherein the movement laterally along the vehicle body can be driven via a rotation of the motor in the opposite direction to the rotation during the opening movement, wherein a rotation of the drive lever and of the guide lever in particular can be generated via the rotation of the motor. The closing movement can thus alternatively take place in the reverse order to the opening movement, whereby the motor rotates in the opposite direction to the rotation during the opening movement.

Corresponding to a closing movement designed/configured analogously to the opening movement, it is also conceivable that the cover device can be moved in a closing movement after a movement laterally along the vehicle body perpendicular to the vehicle body against the direction of the charging port. Accordingly, during a closing movement of the motor-driven cover device, the drive lever can, for example, after reaching its lowering position by the guide rail, terminate its rotational movement and, upon further rotation of the motor, transition to a lowering movement. In doing so, the drive lever can, for example, drive the guide lever by means of a coupling, whereby the cover plate is also set into a lowering movement and can finally be brought back into a closed position flush with the vehicle outer surface.

Within the scope of a compact, space-saving and flexibly variable possible form of a guide element for guiding the cover plate along a movement path during the opening movement and the closing movement of the cover plate, it can be advantageously provided in accordance with the invention that the guide element is designed/configured in the form of a thread, the thread can be arranged within the motor. By an arrangement within the motor it can be understood here in particular that the thread is part of the motor or the drive. With regard to a structurally simple, flexibly adjustable and precisely controllable movement of a motor-driven covering device according to the invention, it can be advantageously provided that the motor is formed in the form of a spindle drive, optionally in the form of a screw spindle drive, wherein the screw spindle drive is driven in particular via an actuator.

Here, the screw spindle drive can be designed/configured in such a way that the screw spindle drive has a screw spindle with a thread and a drive pin, an actuator for driving the screw spindle, a rotation transmission device and a driver for initiating a closing movement. The rotational movement of the drive element can be precisely adjusted via the thread, which is optionally arranged around the screw spindle. In this case, the screw spindle can be driven by an actuator which can transmit its rotary motion to a rotation transmission device and/or a drive journal and can set the screw spindle in rotation. In this case, the driver can initiate a closing movement in particular by giving the drive lever the angular momentum sufficient for closing. The driver can thus start the rotational movement of the drive lever and thereby move the cover plate and the guide lever coupled to the cover plate. The guide lever, which is optionally coupled to the drive lever, can also be rotated in the process and follow the laterally moving cover plate or guide the cover plate in a movement or rotation dependent on the bearing pin of the guide lever.

In order to prevent improper opening of the cover device, it may further be provided that the thread of the screw spindle has a flat run-out with a pitch angle of less than 15° to the horizontal, and in some cases less than 10° to the horizontal. In a closed state, such a flat run-out of the thread prevents the drive lever from being moved by the application of force or misuse of the cover plate unit and thus constitutes a kind of locking groove. The cover plate is thus mechanically locked in the closed position.

Within the framework of a safe possible and durable design/configuration of the engine-operated cover device, it can also be advantageous if a seal is provided to prevent the entry of water, the seal optionally being arranged directly on the cover plate in order to seal off an air gap between the vehicle body and the cover plate with respect to the vehicle exterior in a closed state of the cover device. In one example, the seal can be arranged in this case between the cover plate and a holding frame for the cover plate, in particular be squeezed in. Furthermore, the seal can advantageously be made of a plastic, for example silicone, polyurethane, polyvinyl chloride, polyetrafluoroethylene or rubber.

In addition, within the framework of a durable design and with regard to a compact arrangement of the motor-driven cover device, it can be advantageous if a housing is provided to accommodate the other components of the motor-driven cover device, the housing optionally being formed from a plastic, in particular in the form of an injection-molded plastic part. In this case, the housing can be arranged directly detachably or non-detachably to the vehicle body of the electric vehicle.

In the context of a convenient possible design/configuration of the motor-driven cover device, it can be provided in particular that a sensor is provided for detecting an opening and/or closing command for opening and/or closing the cover plate, the sensor optionally being formed in the form of a movement sensor and/or proximity sensor, in particular in the form of a capacitive sensor. In one example, the sensor is capable of identifying a motion gesture, for example a wiping motion or the like, as an opening and/or closing command to cover or uncover the subject motor-driven cover device. Likewise, the sensor may be provided, in particular with respect to an automatic charging process, for detecting a charging robot or the like that can automatically charge a parked vehicle, for example. Also conceivable is an embodiment of a sensor provided, for example, for detecting an opening and/or closing command via interaction with a smart phone or other user terminal.

In order to be able to carry out a charging process even in poor visibility conditions, it can also be advantageously provided in accordance with the invention that an illumination device is provided for illuminating a charging port and/or for displaying information, the illumination device can be formed in the form of at least one, in particular a plurality of LEDs. In this case, the lighting device can in particular also illuminate the surrounding area arranged directly around the charging port. In one example, the switching-on process of the lighting device can be coupled with an opening or closing process of the cover plate. Furthermore, it is conceivable that the lighting device displays information, for example about a current charging state, a charging authorization, a charging process currently being carried out, a completed charging process or the like, for example via differently colored LEDs or the like.

In addition, with regard to an increase in convenience when carrying out a charging process, it can be provided that a charging state display is provided for displaying a current charging state of the electric vehicle, the charging state display optionally having a plurality of LEDs. In addition to a mere display of a current charging state of the electric vehicle, additional information, such as information about a charging authorization, a currently performed charging process, a completed charging process or the like, can be displayed via an objective charging state display.

In order to ensure accessibility to the present motor-driven cover device even at cold temperatures below the freezing point, it can be advantageous if a de-icing means is provided for de-icing an at least partially frozen cover plate, the de-icing means optionally being in the form of an electrically operated de-icing means, the electrically operated de-icing means comprising in particular a heating means and/or a ventilation means. The heating means of the electrically operated de-icing means can advantageously be formed in the form of a heating coil or the like within the scope of a structurally simple design/configuration, whereas the aeration device/means can be formed in the form of a fan, ventilator or blower. Such a ventilation device/means and/or heating device/means can, for example, be operated during an operation of an electric vehicle, optionally driven via a generator, in order to prevent freezing of the cover device during an operation of an electric vehicle.

With regard to a reliable and energy-saving guarantee of accessibility to the present motor-driven cover device even at cold temperatures below the freezing point, it is further conceivable that a de-icing device/means is provided for de-icing an at least partially frozen cover plate, wherein the de-icing device can be formed in the form of a deformation element, in particular in the form of a deformable seal. In this case, the deformation element can be arranged between a cover plate and the vehicle body and, in particular, in addition to deicing, is optionally provided for preventing the entry of water from a vehicle exterior into a charging port. Advantageously, the deformation element here has a deformation zone in which the water from the surroundings collects and possibly freezes to form ice. In this case, the cover device can optionally generate a deformation of the deformation element within the deformation zone via a movement of the cover device in the closing direction beyond the closed position, so that the ice arranged within the deformation zone is broken and icing can be released.

For the emergency opening of the present motor-driven cover device, for example in the event of a defect of the cover plate, the force transmission device, the guide element or the like, it can be further provided that an emergency unlocking device/means is provided for the emergency unlocking of the motor-driven cover device, wherein the emergency unlocking device can be formed in the form of a purely mechanically operable emergency unlocking device, in particular in the form of an operable cable and/or crank drive. For example, the emergency unlocking means can also be formed in the form of an accessible catch strap which can be pulled on in order to actuate the emergency unlocking means.

It is also a task of the invention to provide an electric vehicle. Here, the electric vehicle comprises a charging port for inserting a charging plug and a motor-driven cover device described above. Thus, the electric vehicle according to the invention brings the same advantages as have already been described in detail with respect to the motor-driven cover device according to the invention. Here, the charging port can be formed to accommodate or introduce charging plugs of European standards, such as standard Type 2 plugs, CCS2 plugs, but also for charging plugs of Japanese, Chinese or American standards.

With regard to an advantageous arrangement of the charging port, it may advantageously be provided that the charging port is arranged in the side of the electric vehicle, optionally arranged within the wings or the rear wings of the electric vehicle.

Likewise, it is conceivable that the charging port is arranged in the front area of the electric vehicle, optionally within the front end module, in particular within the radiator grille.

It is also a task of the invention to provide a method for covering and uncovering a charging port arranged on the vehicle body of an electric vehicle with respect to a vehicle exterior, in particular using a motor-driven cover device described above. In this case, the method according to the invention comprises the steps/stages of driving a motor operatively connected to a cover plate for driving an opening movement and a closing movement of the cover plate, transmitting a motor force of the motor via a force transmission device for carrying out the opening movement and the closing movement of the cover plate, guiding the cover plate along a movement path during the opening movement and the closing movement of the cover plate by means of guide element, the cover plate being moved along the vehicle body of the electric vehicle in the opening and closing movement by means of a motor, the cover plate being at least partially covered by the vehicle body with respect to the vehicle exterior in an opened state of the cover device. Thus, the method according to the invention brings the same advantages as have already been described in detail with respect to the motor-driven cover device according to the invention or the electric vehicle according to the invention.

With regard to a particularly convenient execution of the present method, it can be advantageously provided that before a motor operatively connected to a cover plate is controlled, an opening and/or closing command for opening and/or closing the cover plate is detected by means of a sensor, the sensor can be formed in the form of a motion sensor and/or proximity sensor, in particular in the form of a capacitive sensor. In one example, by means of the sensor, a motion gesture, for example a wiping motion or the like, is identified as an opening and/or closing command to cover or uncover the subject motor-driven cover device. Likewise, the sensor can identify a loading robot or the like that can automatically load a parked vehicle, for example. It is also conceivable that by means of the sensor an opening and/or closing command is given via an interaction with a smart phone or other user terminal.

In order to either allow the cover plate to be guided behind the vehicle body during an opening movement or to allow the cover plate to engage in its end position during a closing movement, it can be further provided that during an opening and closing movement of the cover plate, a movement of the cover plate in the direction of the vehicle body or away from the vehicle body is carried out by means of a positioning element. The executed movement can be executed essentially perpendicular to the vehicle body or essentially perpendicular to the opening movement and closing movement of the cover plate.

Figure 1:
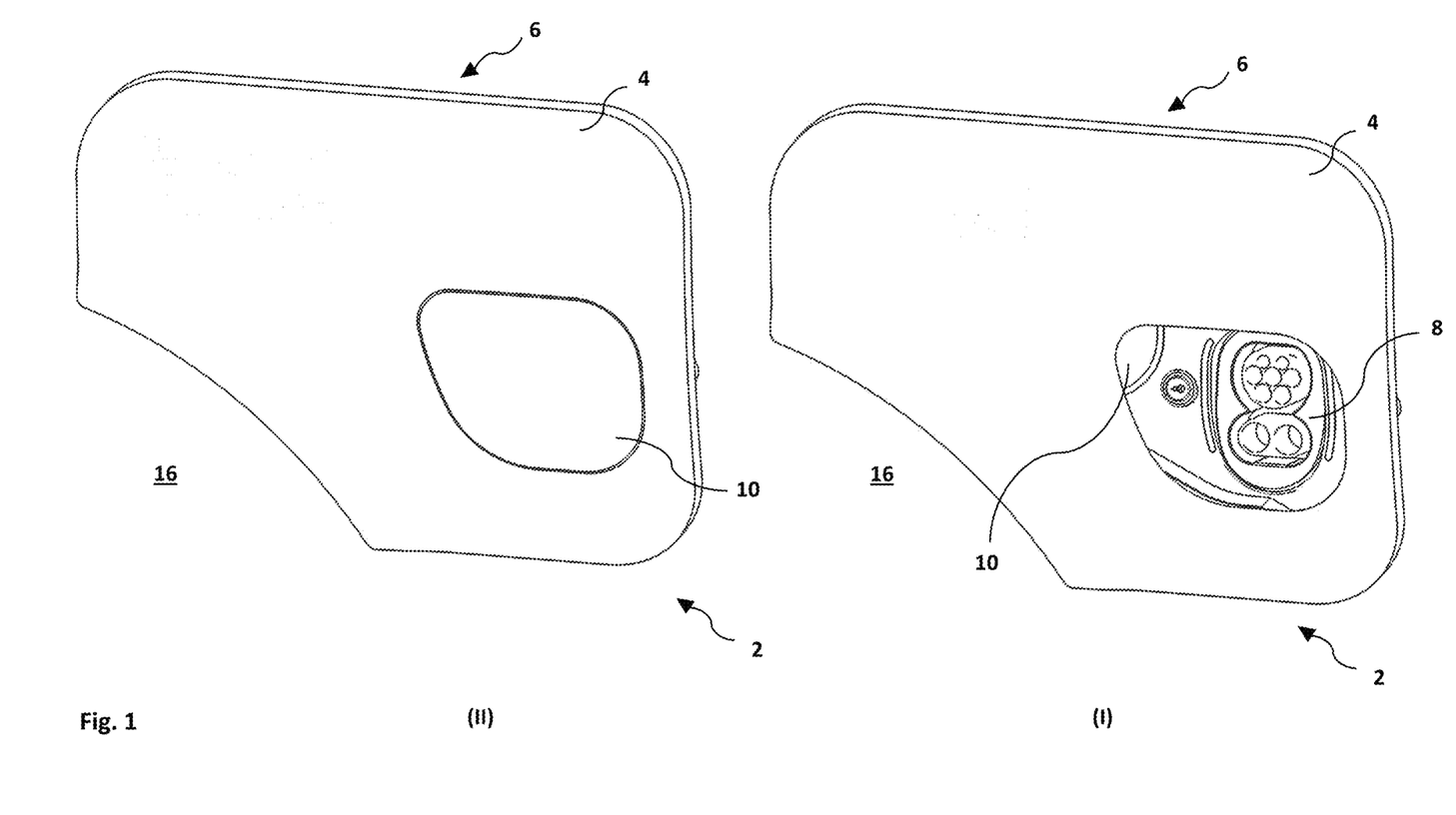
FIG. 1 is a schematic representation of a part of an electric vehicle according to the invention, comprising a motor-driven cover device according to the invention in a closed state (II) and an open state (I) in a top view of the vehicle body of the electric vehicle according to a first embodiment.

FIG. 1 shows a schematic representation of a part of an electric vehicle 6 according to the invention, comprising a motor-driven cover device 2 according to the invention in a closed state (II) and an open state (I). As can be seen from FIG. 1, in a closed state (II) the cover plate 10 covers the charging port 8 with respect to a vehicle exterior 16, whereas in an open state (I) the cover plate 10 is at least partially covered by the vehicle body 4 of the electric vehicle 6 with respect to the vehicle exterior 16.

Figure 2:
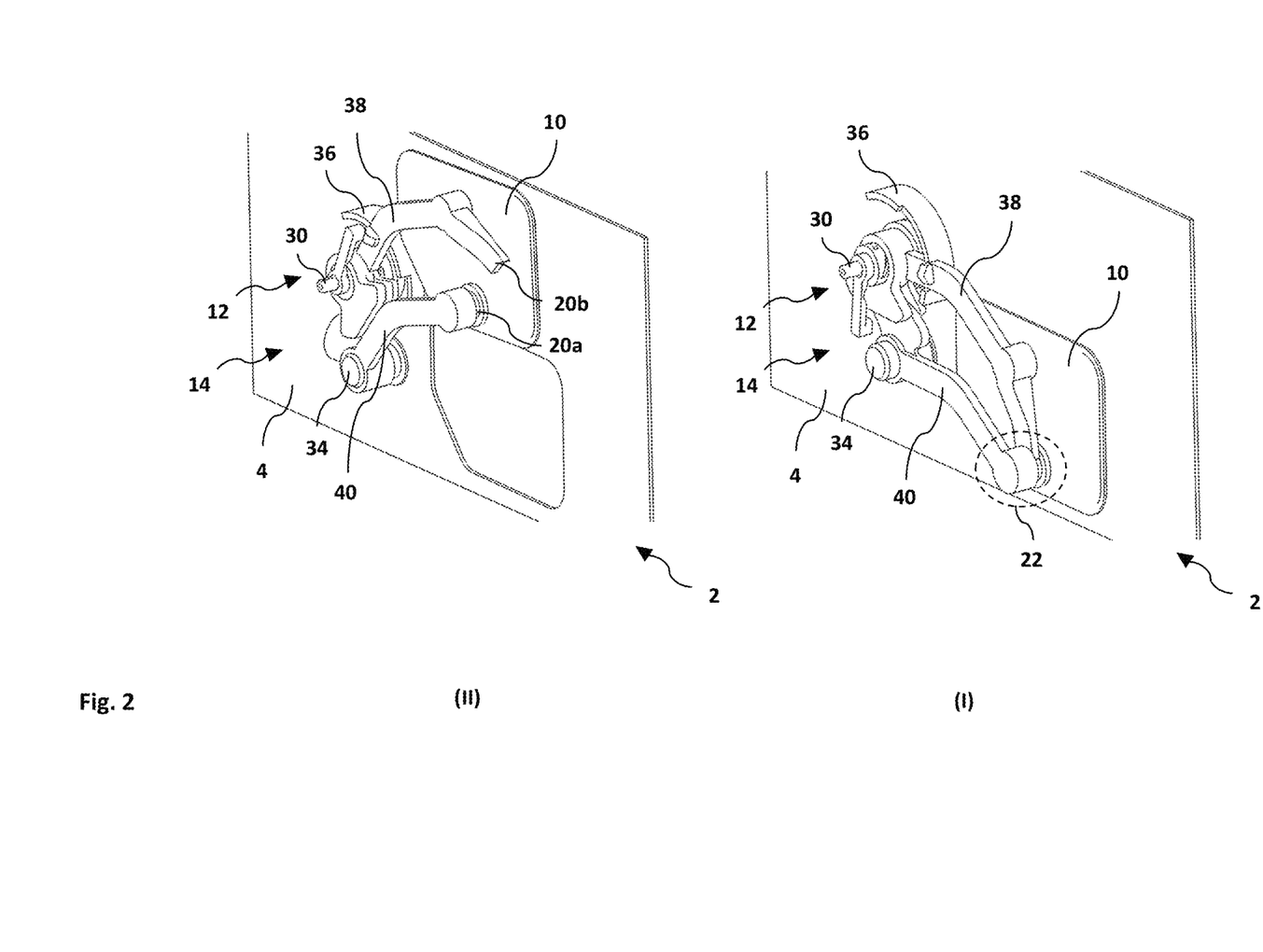
FIG. 2 is a schematic representation of a motor-driven cover device according to the invention in a closed state (II) and an open state (I) in a rear view of the vehicle body of the electric vehicle according to a first embodiment.

FIG. 2 shows a schematic representation of a motor-driven cover device 2 according to the invention in a closed II and an open state I in a rear view of the vehicle body 4 of the electric vehicle 6 according to a first embodiment.

In this case, the motor-driven cover device 2 comprises a cover plate 10 for covering the charging port 8 in a closed state II, a motor 12 operatively connected to the cover plate 10 for driving an opening movement and a closing movement of the cover plate 10, a force transmission device 14 for transmitting a motor power of the motor 12 for carrying out the opening movement and the closing movement of the cover plate 10, (guide element 18 not visible in the present case) for guiding the cover plate 10 along a movement path during the opening movement and the closing movement of the cover plate 10, the motor-driven cover device 2 being designed in such a way that the cover plate 10 can be moved along the vehicle body 4 of the electric vehicle 6 in the opening and closing movement in a motor-driven manner, the vehicle body 4 covering the cover plate 10 in an opened state II of the cover device 2 at least partially with respect to the vehicle exterior 16.

As can be seen according to FIG. 2, the force transmission device 14 is formed in the present case in the form of a four-bar linkage drive, the four-bar linkage drive can have at least one drive lever 38 and one guide lever 40 for transmitting a motor force of the motor 12 for executing the opening movement and the closing movement of the cover plate 10, the drive lever 38 and the guide lever 40 in particular being connected to the cover plate 10.

The drive lever 38 is in engagement with the motor 12 in this case, the drive lever 38 being arranged directly on the motor 12, in particular adjacent to the guide rail 36 over which the drive lever 38 is guided in its movement.

In this case, the guide lever 40 is rotatably and displaceably mounted on a bearing pin 34 via an end of the guide lever 40 that is arranged remote from the cover plate 10, the bearing pin 34 being permanently connected to the vehicle body 4 of the electric vehicle 6.

The drive lever 38 and the guide lever 40 are at least temporarily fittingly connected to one another during an opening and a closing movement, in this case via a groove-spring connection 22, the drive lever 38 and the guide lever 40 being temporarily connected to one another in particular in such a way that the guide lever 40 can be moved along in a direction perpendicular to the vehicle body 4 via the drive lever 38 while ensuring free rotatability.

Figure 3:
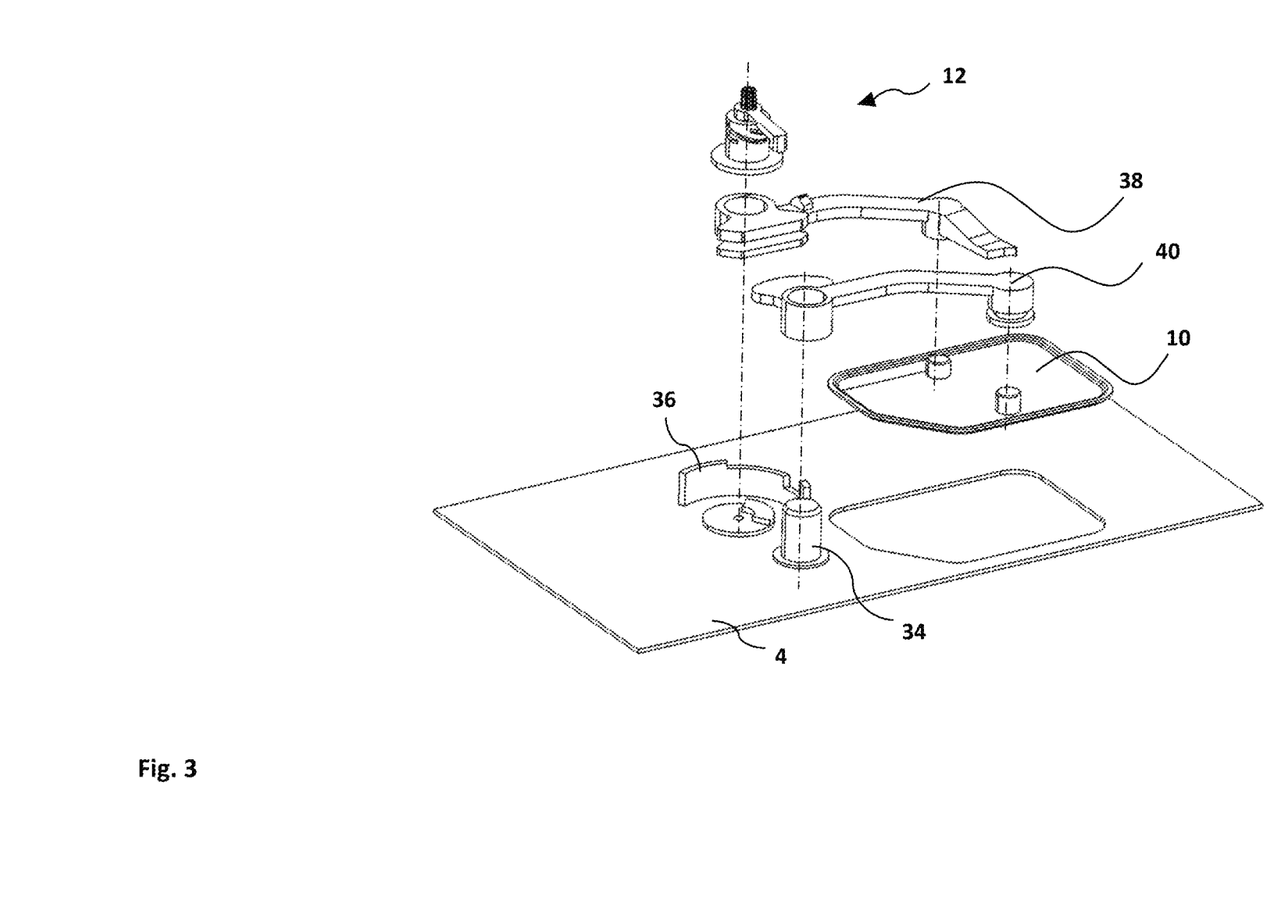
FIG. 3 is a schematic representation of a motor-driven cover device according to the invention in an exploded view according to a first embodiment.

FIG. 3 shows a schematic representation of a motor-driven cover device 2 according to the invention in an exploded view according to a first embodiment. According to the exploded view, individual components of the motor-driven cover device 2, in particular the cover plate 10, the motor 12, the force transmission device 14 designed in the form of a drive lever 38 and a guide lever 40, as well as the bearing pin 34 and the guide rail 36 can be seen.

Figure 4:
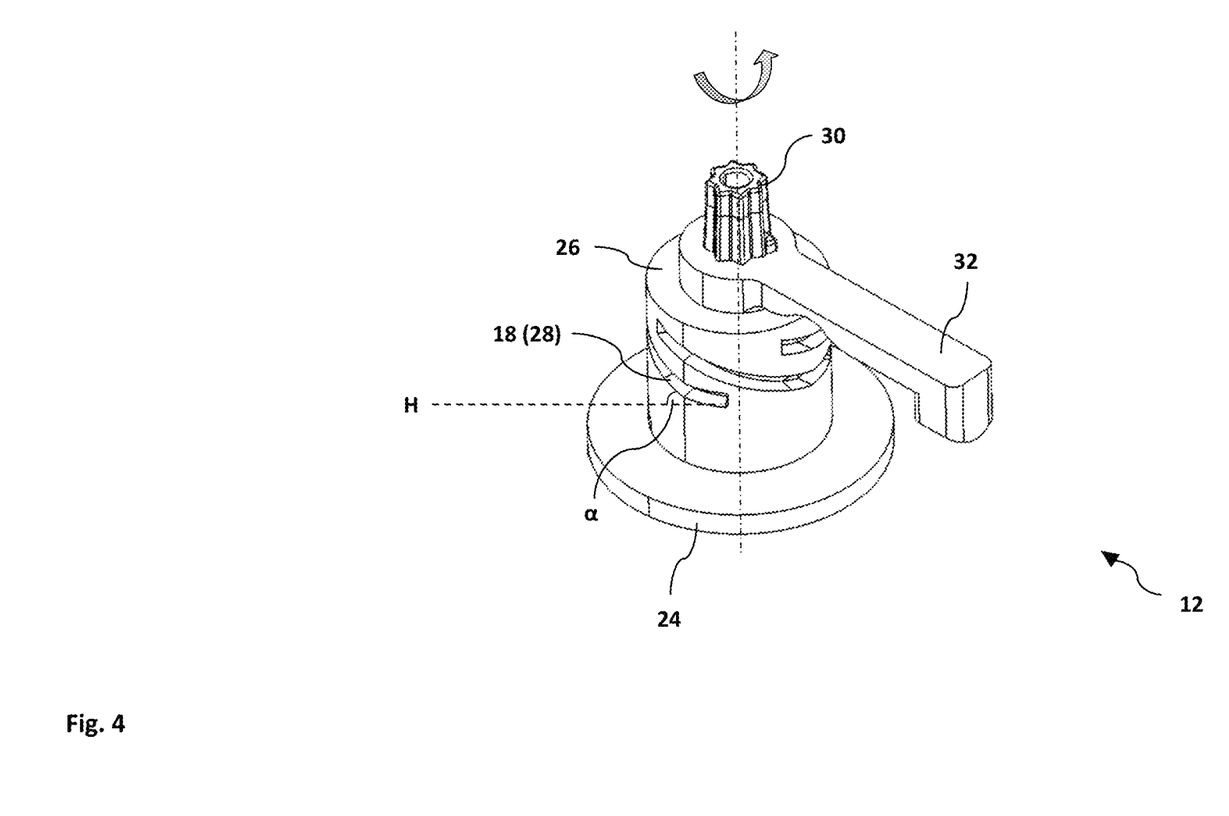
FIG. 4 is a schematic representation of a motor of the motor-driven cover device operatively connected to the cover plate for driving an opening movement and a closing movement of the cover plate according to a first embodiment.

FIG. 4 shows a schematic representation of a cover plate 10 in operative connection with the cover plate 10 standing motor 12 of the motor-driven cover device 2 for driving an opening movement and a closing movement of the cover plate 10 according to a first embodiment.

As can be seen according to FIG. 4, the guide element 18 is presently in the form of a thread 28, the thread 28 being arranged within the motor 12.

The motor 12 is formed in the form of a spindle drive, in this case in the form of a screw spindle drive, the screw spindle drive being driven via an actuator. The screw spindle drive has a screw spindle 26 with a thread 28 and a drive pin 30, an actuator for driving the screw spindle 26, a rotation transmission device 24 and a driver 32 for initiating a closing movement.

The thread 28 of the screw spindle 26 also has a shallow run-out with a pitch angle $\alpha$ of less than 15° with respect to the horizontal H, and in some cases less than 10° with respect to the horizontal H, to allow improper opening of the cover plate 10.

Figure 5A:
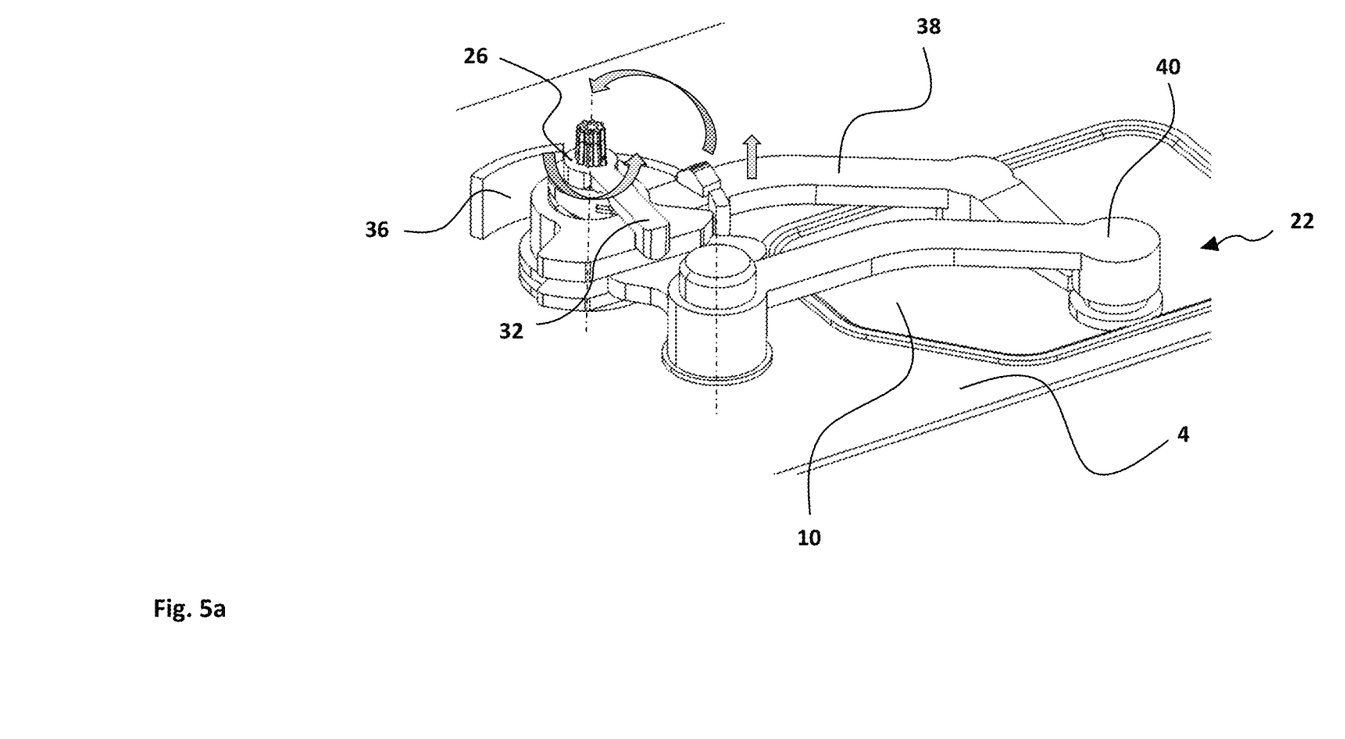
FIG. 5a a schematic representation of a motor-driven cover device according to the invention in a top view during an opening movement in a first state of the opening movement according to a first embodiment.

FIG. 5a shows a schematic representation of a motor-driven cover device 2 according to the invention in a top view during an opening movement in a first state of the opening movement according to a first embodiment.

In this first state of the opening movement, the cover plate 10 still lies flush against the vehicle body 4 of the electric vehicle 6 within the recess provided. A rotation of the actuator of the motor 12 causes in particular a rotation of the screw spindle 26 including the driver 32, which in turn causes an initiation of the movement of the drive lever 38. In this case, the drive lever 38 initially moves perpendicularly to the vehicle body 4, thereby initiating an opening process of the cover plate 10. Via the groove-spring connection 22 between the drive lever 38 and the guide lever 40, the cover plate 10 is finally displaced in the direction of the charging port 8.

Figure 5B:
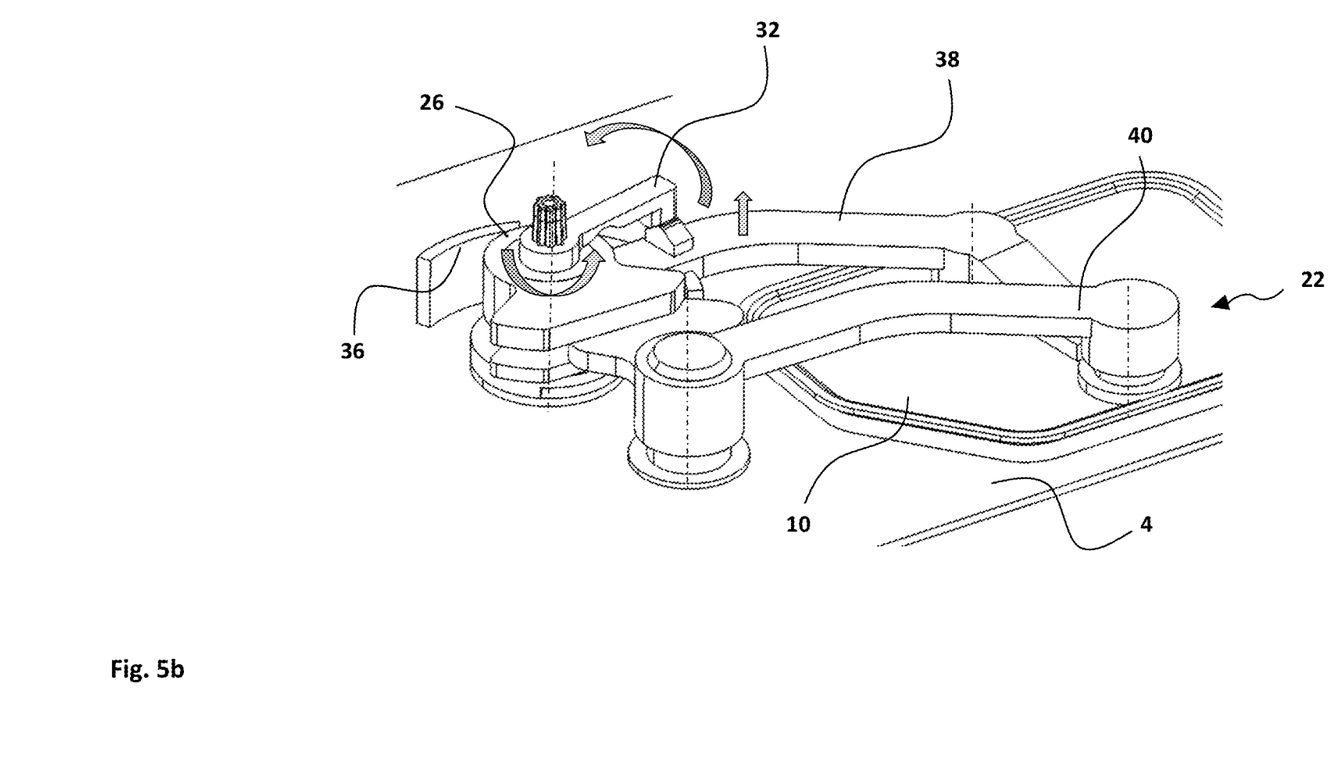
FIG. 5b is a schematic representation of a motor-driven cover device according to the invention in a top view during an opening movement in a second state of the opening movement according to a first embodiment.

FIG. 5b shows a schematic representation of a motor-driven cover device 2 according to the invention in a top view during an opening movement in a second state of the opening movement according to a first embodiment.

In the second state, after a movement of the drive lever 38 perpendicular to the vehicle body 4 and a resulting opening of the cover plate 10, the motor 12 is rotated further and the drive lever 38 is thereby set into a rotational movement laterally along the vehicle body 4 of the electric vehicle. The drive lever 38 is held in its path by the guide rail 36.

Figure 5C:
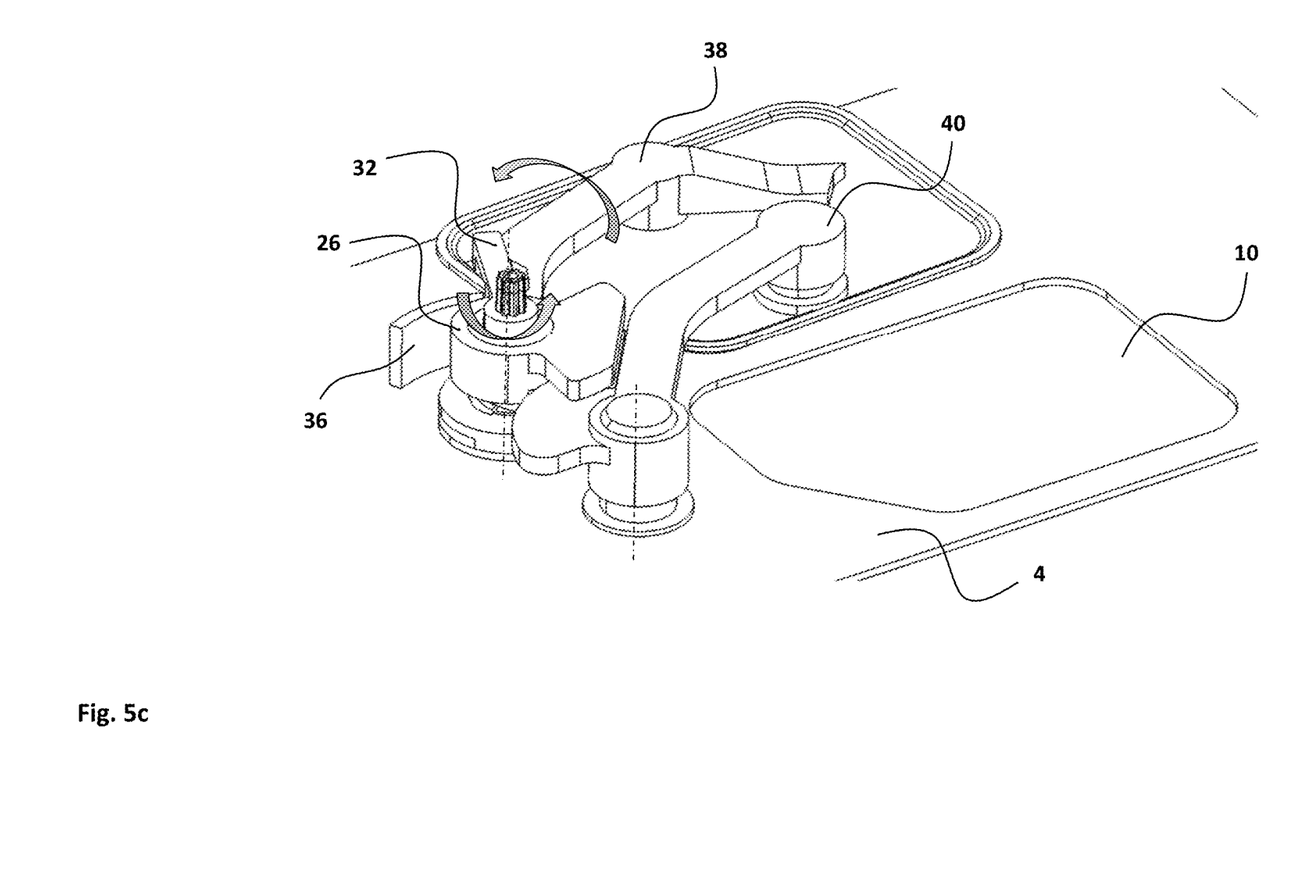
FIG. 5c is a schematic representation of a motor-driven cover device according to the invention in a top view during an opening movement in a third state of the opening movement according to a first embodiment.

FIG. 5c shows a schematic representation of a motor-driven cover device 2 according to the invention in a top view during an opening movement in a third state of the opening movement according to a first embodiment.

In the third condition, it can be seen that the drive lever 38 as well as the guide lever 40 have been caused to rotate by further rotation of the motor 12, thereby driving the cover plate 10 accordingly to uncover the charging port 8.

Figure 6:
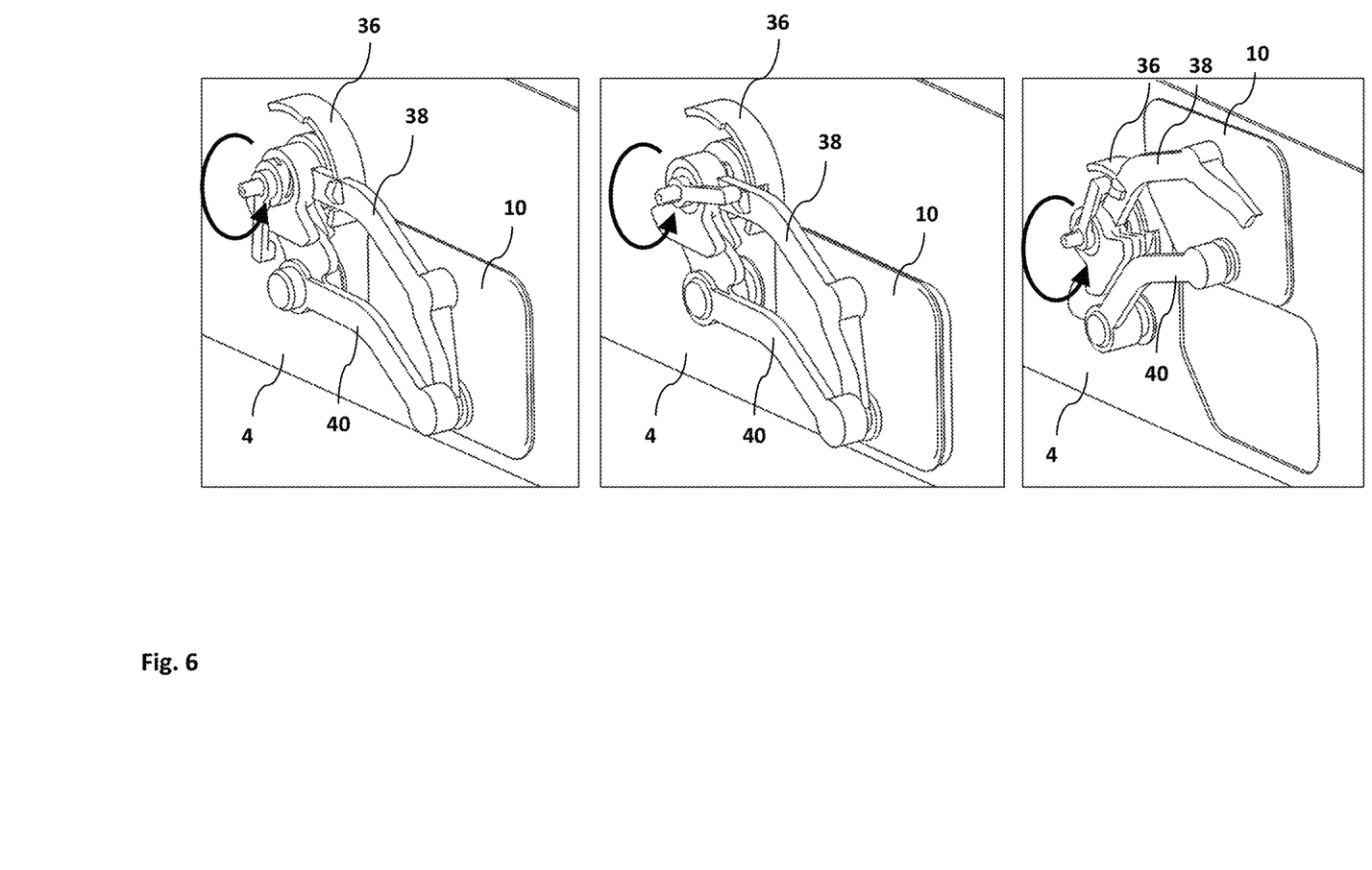
FIG. 6 is a schematic representation of a motor-driven cover device according to the invention in a side view during an opening movement in a first (left), second (center) and third (right) state of the opening movement according to a first embodiment.

FIG. 6 shows a schematic illustration of a motor-driven cover device 2 in a side view during an opening movement as already shown in FIG. 5, first (left), second (center) and third (right) state of the opening movement according to a first embodiment example.

As can be seen in FIG. 6, the motor-driven cover device 2 is designed in such a way that, during the opening movement, the cover plate 10, driven by the motor 12, can initially be moved perpendicularly to the vehicle body 4 in the direction of the charging port 8, wherein, driven by the motor 12, first the drive lever 38 and then, by means of coupling via a groove-spring connection 22, also the guide lever 40 can be moved in the direction of the charging port 8, wherein the movement perpendicularly to the vehicle body 4 in the direction of the charging port 8 is presently limited to less than 5 cm.

Furthermore, it can be seen that the motor-driven cover device 2 can be moved laterally along the vehicle body 4 in an opening movement after a movement perpendicular to the vehicle body 4 in the direction of the charging port 8, wherein the movement laterally along the vehicle body 4 can be driven in the present case by means of a further rotation of the motor 12, wherein a rotation of the drive lever 38 and of the guide lever 40 can be generated in particular by means of the rotation of the motor 12.

A closing movement can be executed analogously to an opening movement, only then correspondingly in the reverse order, with the motor 12 rotating in particular in the opposite direction.

Figure 7:
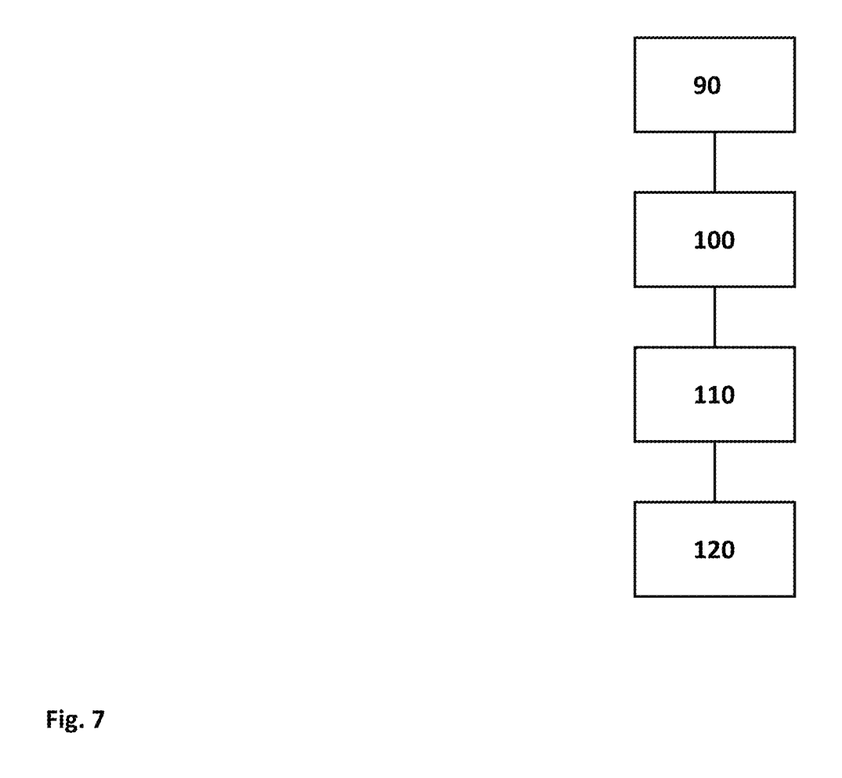
FIG. 7 is a schematic representation of the individual steps of a method according to the invention for covering and releasing a charging port arranged on the vehicle body of an electric vehicle.

FIG. 7 shows a schematic representation of the individual steps/stages of the method according to the invention for covering and releasing a charging port 8 arranged on the vehicle body 4 of an electric vehicle 6. Here, the method according to the invention first comprises an optional stage of detecting 90 an opening and/or closing command for opening and/or closing the cover plate 10 by means of a sensor 44, the stage of controlling 100 a motor 12 connected to the cover plate 10 for driving an opening movement and a closing movement of the cover plate 10, the stage of transferring 110 a motor power of the motor 12 by means of a power transmitting device 14 to perform the opening movement and the closing movement of the cover plate 10, and the stage of guiding 120 the cover plate 10 along a movement path during the opening movement and the closing movement of the cover plate 10 by means of a guiding element 18, wherein the cover plate 10 is moved along the vehicle body 4 of the electric vehicle 6 in a motor-driven manner during the opening and closing movement, wherein the cover plate 10 is at least partially covered by the vehicle body 4 with respect to the vehicle exterior 16 in an opened state (II) of the cover device 2.

By means of the motor-driven cover device according to the invention as well as by means of the method according to the invention, it is in particular possible to provide a cover device for covering and releasing a charging port arranged on the vehicle body of an electric vehicle, which has a minimum space requirement during a charging process and at the same time offers safe charging, safe opening and closing of the cover plate as well as a high charging comfort.

LIST OF REFERENCE SIGNS

2 Motor-driven cover device
4 Vehicle body
6 Electric vehicle
8 Charging port
10 Cover plate
12 Motor
14 Force transmission device
16 Vehicle exterior
18 Guide element
20a Groove
20b Spring
22 Groove-spring connection
24 Rotation transmission device
26 Screw spindle
28 Thread
30 Drive pin
32 Driver
34 Bearing pin
36 Guide rail
38 Drive lever
40 Guide lever
44 Sensor
90 Detection of an opening and/or closing command
100 Controlling a motor that is operatively connected to a cover plate
110 Transferring a motor power
120 Guiding the cover plate along a movement path
I opened state
II closed state
H Horizontal
α Pitch angle The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A motor-driven cover device for covering and uncovering a charging port arranged on a vehicle body of an electric vehicle with respect to a vehicle exterior, comprising:
    -a cover plate for covering the charging port in a closed state,
    a motor operatively connected to the cover plate for driving an opening movement and a closing movement of the cover plate,
    a force transmission device for transmitting a motor power of the motor to perform the opening movement and the closing movement of the cover plate, and
    a guide element for guiding the cover plate along a movement path during the opening movement and the closing movement of the cover plate,
wherein the motor-driven cover device is designed in such a way that the cover plate can be moved along the vehicle body of the electric vehicle in a motor-driven manner during the opening and closing movement, the vehicle body covering the cover plate at least partially with respect to the vehicle exterior in an opened state of the cover device.

2. The motor-driven cover device according to claim 1, wherein the force transmission device is formed in the form of a four-bar linkage drive.

3. The motor-driven cover device according to claim 1, wherein a drive lever is in engagement with the motor.

4. The motor-driven cover device according to claim 1, wherein the guide element is mounted rotatably and displaceably on a bearing pin via an end of the guide element which is arranged remote from the cover plate.

5. The motor-driven cover device according to claim 1, wherein the drive lever and the guide element are at least temporarily fittingly connected to one another during an opening movement and a closing movement.

6. The motor-driven cover device according to claim 1, wherein the motor-driven cover device is designed in such a way that, during the opening movement, the cover plate, driven by the motor, can initially be moved perpendicularly to the vehicle body in a direction of the charging port.

7. The motor-driven cover device according to claim 6, wherein the drive lever is movable first and then, by means of coupling via a groove-spring connection, the guide element is also movable in the direction of the charging port, wherein movement perpendicular to the vehicle body in the direction of the charging port is limited to less than 5 cm.

8. The motor-driven cover device according to claim 1, wherein the motor-driven cover device can be moved laterally along the vehicle body in an opening movement after a movement perpendicular to the vehicle body in a direction of the charging port.

9. The motor-driven cover device according to claim 1, wherein the motor-driven cover device can first be moved laterally along the vehicle body in a closing movement driven by the motor.

10. The motor-driven cover device according to claim 1, wherein the cover device can be moved in a closing movement after a movement laterally along the vehicle body perpendicular to the vehicle body opposite to a direction of the charging port.

11. The motor-driven cover device according to claim 1, wherein the guide element is in the form of a thread.

12. The motor-driven cover device according to claim 1, wherein the motor is formed in the form of a spindle drive.

13. The motor-driven cover device according to claim 12, wherein the spindle drive comprises a screw spindle, with a thread and a drive pin, an actuator for driving the screw spindle, a rotation transmission device and a driver for initiating a closing movement.

14. The motor-driven cover device according to claim 13, wherein the thread of the screw spindle has a flat run-out with a pitch angle of less than 15° to horizontal.

15. An electric vehicle comprising a charging port for introducing a charging plug and a motor-driven cover device according to claim 1.

16. The electric vehicle of claim 15, wherein the charging port is arranged in a side of the electric vehicle.

17. The electric vehicle of claim 15, wherein the charging port is arranged in a front area of the electric vehicle.

18. A method for covering and uncovering a charging port arranged on a vehicle body of an electric vehicle with respect to a vehicle exterior, using a motor-driven cover device according to claim 1, comprising:
 -controlling a motor operatively connected to a cover plate for driving an opening movement and a closing movement of the cover plate,
 transferring a motor power of the motor via a force transmission device for performing the opening movement and the closing movement of the cover plate, and
 guiding of the cover plate along a movement path during the opening movement and the closing movement of the cover plate by a guide element,
wherein the cover plate is moved along the vehicle body of the electric vehicle in a motor-driven manner during the opening and closing movement, the cover plate being at least partially covered by the vehicle body with respect to the vehicle exterior in an open state of the cover device.

19. The method according to claim 18, wherein before a motor which is operatively connected to a cover plate is controlled, at least an opening or closing command for at least opening or closing the cover plate is detected by means of a sensor.

20. The method according to claim 18, wherein during an opening and closing movement of the cover plate, a movement of the cover plate in a direction of the vehicle body or away from the vehicle body is carried out by means of a positioning element.

* * * * *